June 18, 1963

A. O. LUNING 3,094,235

COASTERS – VACUUM CUP

Filed Oct. 14, 1957

INVENTOR

Alfred O. Luning

BY

ATTORNEY

United States Patent Office 3,094,235
Patented June 18, 1963

3,094,235
COASTERS—VACUUM CUP
Alfred O. Luning, 5615 Kennedy St., Riverdale, Md.
Filed Oct. 14, 1957, Ser. No. 689,829
13 Claims. (Cl. 215—100.5)

This invention relates to coasters, trays, pads and similar articles used under drinking glasses, pitchers, dishes and the like. For clarity, convenience and the preservation of continuity the words coaster and tumbler will hereinafter be used with reference to all of the extensive category of objects into which these two articles fall, it being appreciated (upon study of this specification) that this invention will aptly apply as much to other articles in the category as it does to the representative ones chosen to explain this invention.

It is an object of this invention to provide a self-attaching, moisture-absorbing, and/or insulating coaster with a platelike body designed to accommodate tumblers of various sizes as those used for holding hot and cold liquids, solids and foods such that the coaster remain affixed to the tumbler and obviate the need for the coaster to be carried separately when the latter is transported about or is left at rest upon supporting objects as furniture in order to protect the objects from damage due to direct contact with heat, cold, moisture and liquids originating upon and/or emanating from said coaster.

Another object of this invention is to provide a coaster as described which has for an attaching device a simple suction or vacuum cup with a central hole in its base through which is inserted a very simple, effective and accessible vacuum release device.

Another object of this invention is to provide a coaster in which the vacuum cup attaching device may be formed integral with or separable from the coaster body permitting a choice, in the separable case, of making the body of a wide variety of materials while the vacuum cup is made necessarily of resilient materials like rubber and its compounds. Making the coaster body of soft and resilient materials like the cup portion provides a coaster less apt to damage objects it is placed upon, particularly if placed heavily upon them.

Another object of this invention is to provide a coaster as described in which the vacuum cup is threaded at its base to permit it to move axially in a corresponding threaded portion of the coaster, thereby enabling the coaster to be adjusted to accommodate tumblers with bottoms having different size recesses in them.

Another object of this invention is to provide a coaster in which the moisture absorbent and/or insulating material on its upper surface is of such resilience that a tumbler lightly pressed against it would depress it sufficiently to take up and compensate for the natural resilient springback inherent in the vacuum cup thereby insuring a resultant even, steady support under the tumbler.

Another object of this invention is to show wherein a coaster may be provided on which is used a relatively non-resilient, moisture absorbent and/or insulating material whereby natural, resilient springback of the suction cup is compensated for by the resilient springback of intermittent projections situated obliquely on the top surface of the coaster base.

Another object of this invention is to provide a coaster in which projections on its bottom are located and positioned to permit dry-stacking when stored one against the other, that the moisture-absorbent material of one coaster, if wet, does not contact and wet the underside of a neighboring coaster such that the bottom of the latter would require drying off to avoid wetting any support upon which it was subsequently placed. Another object of this invention is to provide coasters in which the aforementioned projections on its bottom also serve to space the coasters when stored to allow free circulation of air around them to insure quick drying and to preclude the growth of mold or mildew formations from otherwise locked-in dampness.

Another object of this invention is to provide a coaster that, by virtue of being attachable to a tumbler, precludes the dripping off of atmospheric condensation and/or other liquids that chance to form and collect upon them when said coaster and tumbler are brought to the lips as in drinking or are otherwise tilted as in pouring.

Another object of this invention is to provide an attachable and detachable coaster in which the vacuum cup attaching device is completely hidden from view when used, thereby enhancing the appearance of the coaster and contributing substantially to its appeal, an essential consideration to be given an article of this nature.

Another object of this invention is to provide a coaster as described in which the simplicity and location of the air or vacuum release device upon it is such as will enable instant attachment or detachment of coaster and tumbler with, at minimum, the use of one hand to accomplish either operation.

Further objects of the invention will be understood from the following description and the accompanying illustrations.

Figure 1:
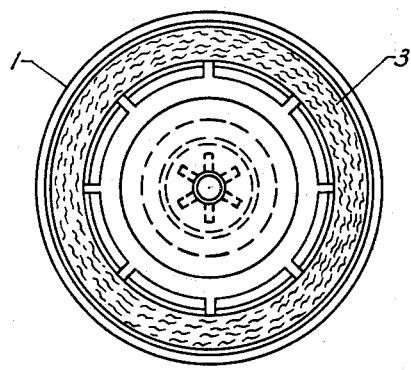
FIG. 1 is a plan view of the coaster of this invention.
Figure 2:
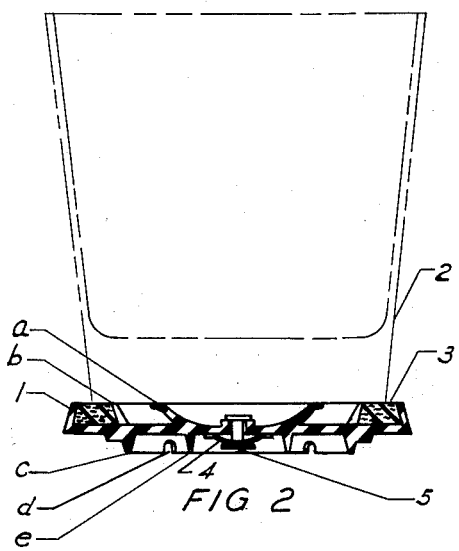
FIGURE 2 is a sectional view of the coaster of FIG. 1 with an outline of a drinking glass resting upon it.

FIG. 2 a cross-section of FIG. 1, shows an arrangement of typical parts of this invention. Item 1 of FIG. 2 is the coaster body platelike in form upon which is shown resting a common drinking tumbler, item 2. Part *b* of the coaster body, item 1, are intermittent projections which principally support the glass tumbler; part *c* of the coaster is a projection forming the bottom support; part *a* is a suction cup made of rubber, plastic or other suitable resilient material; the cup is formed integral with the coaster body and is shown in the deflected position in cooperating suction engagement with the bottom of tumbler 2.

Item 5 is a short, headed valve pin through a free-fitting valve hole in the central portion of suction cup *a*. Attached to the valve pin is a thin dished spring washer, item 4 shown in plan view in FIG. 8 having radiating resilient arms *m*, which exert a downward force against the bottom head of the pin; it can be appreciated that other types of springs may also be employed against the head of the pin with equal effectiveness. But the spring used in this invention, being wafer thin, is unique in that it allows construction of a light thin coaster which is highly desirable in an article of this kind. The force of the spring is upward against the bottom of the coaster and downward against the lower end of the pin such that the top end of the pin is tightly pressed against the opening of the free-fitting valve hole originating within the suction cup thereby sealing the cup against passage of air through the hole. When tumbler 2 has been placed on the coaster and deflects the suction cup as illustrated in FIG. 2 at a, the resultant vacuum or suction of the cup upon the tumbler may be broken or released by pressing upward against the bottom of pin 5. Such release can be easily effected with the third or fourth fingers of one hand while holding the tumbler, coaster attached, between the remaining fingers; or the release may be effected by pressing the head of pin 5 against any hard object while the tumbler is grasped in one hand with the coaster attached.

Item 3 is a moisture absorbent and/or insulting material such as rubber or synthetic sponge, paper, cork or the like. The absorbent material may be locked into the dovetail channel section formed by projections b and the sidewalls of the coaster; the material also may be formed into the dovetail section, cemented in place or attached by combinations thereof. Projections b are oblique to the bottom of the coaster that they yield outward and downward slightly under pressure from the glass. Thus when the tumbler is placed upon the coaster it comes in contact first with the vacuum cup. Downward pressure on the tumbler displaces the vacum cup thereby effecting a "suction" airseal between tumbler and cup. Further downward pressure on the tumbler forces it against projections b which deflect outward and downward; this additional pressure further displaces suction cup a. When the tumbler is then released natural resilient springback of projections b compensates for natural resilient springback of suction cup a so that the tumbler rests firmly, free of wobble, stabilizing on the coaster. Projections b are arranged in a circular pattern to support equally the tumbler and are made intermittent that they do not form a secondary suction cup under the tumbler. Also setting apart the projections helps to effect their outward resilient action when subject to pressure from the tumbler bottom as just described. Obviously ribs b must be made of a flexible material like rubber if they are to function as described. Aeration of the underside of the coaster is provided by openings d which preclude the formation of moisture rings when used. Projection e is provided under the vacuum cup for support and to prevent the vacuum cup from sagging when depressed in use.

When a tumbler of cold liquid is secured to the coaster, atmospheric condensation forming on the outside surfaces collects at the base of the tumbler and is quickly absorbed by material 3 of the coaster. Since all condensation on the tumbler collects on the coaster and the coaster remains fast to the tumbler, the coaster effectively eliminates wetting, scorching or otherwise marring of furniture and other objects upon which the tumbler may be placed.

Figure 3:
FIG. 3 is a sectional view showing the two coasters of FIG. 2, nesting one upon the other.

FIG. 3 illustrates how, when two coasters similar to FIG. 2 are stacked as they might be when stored one on top of another, the water absorbent and/or insulating material, item 3, is exposed to the free circulation of air to dry out. It also illustrates how, with careful design, projections c can be made to rest clear of the absorbent material, item 3, that even after use when the absorbent material is wet the coaster projections c that normally contact furniture, for instance, always remain dry thus preventing the formation of water rings on furniture upon re-use of the coaster.

Figure 5:
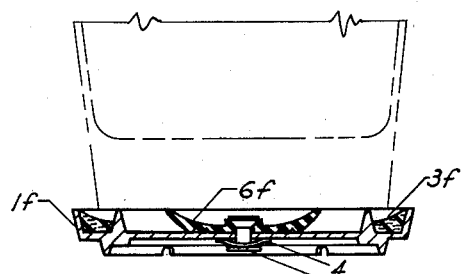
FIG. 5 is a sectional view of the coaster of FIG. 4 with an outline of a drinking glass resting upon it.

FIG. 5 illustrates a coaster, item 1f, and a separable suction cup 6f held in place on the coaster by the headed valve pin 5 under which is spring 4. In this instant embodiment the pin, with spring attached, serves two purposes one of which is to seal the hole in the suction cup through which the pin is placed, and the other to secure the cup to the coaster body. Small annular V-grooves are shown on the bottom of the cup, 6f, to illustrate how the cup may be designed to entrap adhesive should it be desired to further secure it to the coaster by cementing.

Figure 6:
FIG. 6 is a plan view of the spring used in the valve release employed in the coaster of this invention.
Figure 7:
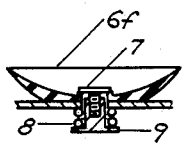
FIG. 7 shows in section a possible variation in the construction of the vacuum release device employed in the coaster herein.

The detachable suction cup in FIG. 5 permits the coaster body to be made from a variety of materials different from the cup which, because of its function, must be formed of resilient substances like rubber. In FIG. 7, p is a supporting projection on the bottom of the coaster body; r is a horizontal surface on the bottom of the coaster inside of and adjacent to p; t is a projection on top of the coaster body. The relationship of p, r, t, is a coacting one such that when two identical coasters as shown in FIG. 7 are nested as when stacked in storing, one on top of the other, as illustrated in FIG. 6, p clears material 3f by virtue of the contact between projections t with surface r that thereby the coasters do not wet each other when stored as to require the drying off of p to preclude wetting a dry surface when the coasters are removed and used again. Also, the coacting relationship of p, r, and t is such as to center stored coasters as illustrated in FIG. 6 and maintain them in interlocked alignment, one atop the other, by virtue of coacting relationship between the sides of p and t preventing horizontal displacement of one coaster relative to the other.

Figure 4:
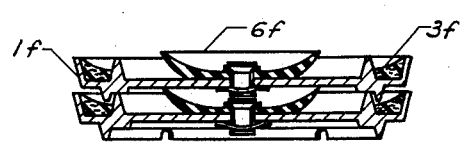
FIG. 4 is a sectional view of the coaster illustrating a second embodiment thereof.

FIG. 4, like FIG. 3, illustrates how, when two similar coasters, FIG. 5, are stacked in storing one on top of another the moisture-absorbent and/or insulating material, item 3f, is exposed to free circulation of air to dry out.

FIG. 7 illustrates another embodiment of the vacuum cup release device in which vacuum cup 6f is attached to a coaster by means of a valve pin made in two parts, 7 and 9, screwed together over a simple compression coil spring, 8, of several turns. It is to be appreciated that various other means can be devised to effect the simple vent seal claimed herein without departing from the nature and spirit of the invention. Other useful possibilities and modifications of this invention are as follows:

(a) Though shown made as one piece of resilient material, the vacuum cup and coaster of FIGS. 2, 3, and 4 might, more practically, be made separately and subsequently attached by any of a number of means.

(b) The intermittent projections b of FIG. 1 though illustrated oblique and outward on the top surface of the coaster might be oriented oblique and inward; or they might assume virtually any shape and orientation upon the coaster and serve their purpose if made of a sufficiently resilient or compressible material to simulate a downward-upward spring action as herein described.

(c) Where projections b of FIG. 1 are used, or where a comparable spring or springy device is so employed, to stabilize and support the tumbler, and to absorb the inherent resilient springback of the vacuum cup, it becomes possible to use quite satisfactorily a non-resilient, moisture absorbent/insulating material upon the coaster.

(d) On very large coasters or trays several vacuum cups might be deployed on the coaster to affix it, for instance, to a large bowl or dish; or several vacuum cups might be attached to a large tray to accommodate more than one tumbler or dish that the tumblers be held from sliding about or tipping over when the tray is used to carry them about. Obviously such a tray would be quite useful on board ships, aeroplanes, trains, automobiles and other vehicles, where rolling, pitching and yawing motions make difficult, if not impossible, the steady carrying about on trays of containers or platters of foods, beverages, and other articles.

Having thus described my invention I make the following claims:

1. An attachable and detachable coaster comprising a platelike body, projections upon the top and the bottom of said body outwardly of the central portion and inwardly of the periphery thereof, said bottom projections forming the support of said coaster, material on the top of said body surrounding said top projections and extending to the peripheral portions of said body, said material having height approximately the same as said top projections, said top projections having height exceeding said bottom projections, and disposed relative thereto further outward on said body wherein a plurality of said coasters stacked one on top of another engage one another that said bottom projections of one coaster interlock within said top projections of an adjacent coaster providing therein means to align and to nest said coasters in said stacking, wherein adjacent coasters are held thereby against sliding one off of another, said stacking occurring further that the lowermost bearing surface of said bottom projections are held in spaced relationship between adjacent coasters providing therein means in said stacking to effectively separate adjacent coasters at their supporting surfaces; said projections upon the bottom of said coaster having a boss at the outer peripheral side of the base thereof wherein, in said stacking of said coaster, said boss on one coaster bears on the upper surface of said top projections of an adjacent coaster that said material on top of said coaster is held in spaced relation between coasters accessible to air outside said coasters; a suction cup on the top of said body situated inwardly of said top projections, a hole axially oriented through said cup, one end of said hole open from underneath said coaster body, said hole containing a suction release valve, said valve having a seat within the inside portion of said suction cup, said valve comprising a pin through said hole, said pin at one end enlarged and adapted therein to seal said hole at said valve seat, spring means cooperating with said pin at the end thereof opposite said enlarged end and at the area immediately surrounding the outside of said hole at said open end underneath said coaster body to produce a resilient force upon said pin in the axial direction thereof wherein said force urges said enlarged end of said pin tightly against said valve seat closing thereby said hole from passage of air, said valve further being accessibly disposed and operable from the underside of said coaster body, resilient means to stabilize the attachment of said coaster to a tumbler wherein in said attachment said means compensates for inherent resilient springback of said suction cup occasioned by said attachment.

2. An attachable and detachable coaster as claimed in claim 1 wherein said suction cup and said coaster body are integral being one and the same article.

3. An attachable and detachable coaster as claimed in claim 1 wherein said resilient means to stabilize the attachment of said coaster to said tumbler is said material on the top of said coaster body, said material having the property of resilience wherein said material, upon attachment of said coaster to a tumbler is compressed with said suction cup that after attachment of said coaster and said tumbler said material urges upward against the bottom of said tumbler in support thereof.

4. An attachable and detachable coaster as claimed in claim 1 wherein said resilient means to stabilize the attachment of said coaster to said tumbler comprises intermittent, resilient projections on the top of said coaster body, said projections obliquely positioned relative to the top of said body and disposed about the central portion thereof that in operation, under the pressing force of a tumbler applied to said coaster, said projections resiliently deflect with said suction cup, and after attachment to said coaster urge upward against the bottom of said tumbler in support thereof.

5. An attachable and detachable coaster as claimed in claim 1 wherein said resilient means to stabilize the attachment of said coaster to said tumbler resides in said material on the top of said coaster body and intermittent projections on the top of said coaster body, said projections obliquely positioned relative to the top of said body and disposed about the central portion thereof, said material and said projections having the property of resilience that upon attachment of said coaster to said tumbler said material is compressed and said projections deflected with said suction cup and that after attachment of said coaster to said tumbler said material and said projections urge upward against the bottom of said tumbler in support thereof.

6. An attachable and detachable coaster as claimed in claim 1 in which friction means is provided to adjust and sustain in adjustment said suction cup upon said coaster wherein said suction cup is axially adjustable relative to said coaster body and held in axial adjustment that thereby said coaster is to accommodate a variety of tumblers having bottoms with recesses of different depths.

7. An attachable and detachable coaster as claimed in claim 6 wherein said friction means to adjust and sustain in adjustment said suction cup upon said coaster comprises a threaded male portion underneath said suction cup, said male portion cooperating with a threaded hole axially placed in said coaster body whereby said suction cup is rendered axially adjustable relative to said coaster body, and whereby said cup is sustained in axial adjustment relative to said coaster body by virtue of a friction fit between said male portion and said cooperating threaded hole.

8. An attachable and detachable coaster as claimed in claim 1 wherein said material on the top of said body surrounding said top projections is moisture absorbent and wherein said coaster, pressed against the bottom of a tumbler and attached thereto by means of said suction cup, remains affixed to said tumbler that by virtue thereof said tumbler may be carried from one place to another, filled and emptied of contents therein precluding the need to separately transport said coaster in so doing, and wherein condensation of moisture upon said tumbler from substances placed inside it, and liquid running down the outside of it, is caught, absorbed and prevented from dripping by said moisture-absorbent material on the top of said coaster that thereby said coaster prevents damage by moisture to objects upon which it may be placed, and from dripping moisture when said tumbler is tilted to empty contents therefrom.

9. An attachable and detachable coaster as claimed in claim 1 wherein said material on the top of said body surrounding said top projections is heat and cold insulating and wherein said coaster, pressed against the bottom of a tumbler and attached thereto by means of said suction cup, remains affixed to said tumbler that by virtue thereof said tumbler may be carried from one place to another, filled and emptied of contents precluding the need to separately transport said coaster in so doing; and wherein heat and cold conducted through said tumbler from substances placed inside it is prevented by said insulating material from damaging objects upon which said tumbler is placed.

10. An attachable and detachable coaster as claimed in claim 1 in which said suction release valve and means to activate said valve are completely concealed from view beneath said coaster that by virtue thereof said valve elements preclude detracting from the appearance of said coaster and increase its desirability potential.

11. An attachable and detachable coaster as claimed in claim 1 wherein said suction cup of flexible, resilient material is separately made and attached to said coaster body that by virtue thereof means is provided to effect making said coaster body separately therefrom and of any suitable material, that thereby materials may be used for said body that expressly would enhance the appearance of said coaster and facilitate manufacture of it.

12. An attachable and detachable coaster comprising a plate-like body having a top and a bottom, a suction cup on said body at the top thereof, material surrounding said suction cup said material having height approximately the same as said cup and extending to the peripheral portions of said body, a hole axially oriented through said cup one end of said hole open from the underside of said coaster body, said hole containing a suction release valve said valve having a seat at the inside portion within said suction cup, said valve comprising a pin through said hole, said pin at one end enlarged and adapted therein to seal said hole at said valve seat, spring means comprising a dished spring washer cooperating with said pin at the end thereof opposite said enlarged end and at the area immediately surrounding the outside of said hole at said open end underneath said coaster body to produce a resilient force upon said pin in the axial direction thereof wherein said force urges said enlarged end of said pin tightly against said valve seat closing thereby said hole from passage of air, said valve further being accessibly disposed and operable from the underside of said coaster body.

13. An attachable and detachable coaster comprising a platelike body having a top and a bottom, a suction cup on said body at the top thereof, material surrounding said suction cup said material having height approximately the same as said cup and extending to the peripheral portions of said body, a hole axially oriented through said cup one end of said hole open from the underside of said coaster body, said hole containing a suction release valve said valve having a seat at the inside portion within said suction cup, said valve comprising a pin through said hole, said pin at one end enlarged and adapted therein to seal said hole at said valve seat, spring means comprising a coiled spring cooperating with said pin at the end thereof opposite said enlarged end and at the area immediately surrounding the outside of said hole at said open end underneath said coaster body to produce a resilient force upon said pin in the axial direction thereof wherein said force urges said enlarged end of said pin tightly against said valve seat closing thereby said hole from passage of air, said valve further being accessibly disposed and operable from the underside of said coaster body.

References Cited in the file of this patent

UNITED STATES PATENTS

| | | |
|---|---|---|
| 1,514,507 | Dreichlinger | Nov. 4, 1924 |
| 1,946,872 | Muhleisen | Feb. 13, 1934 |
| 2,113,888 | Kaparin | Apr. 12, 1938 |
| 2,345,784 | Wolcott | Apr. 4, 1944 |
| 2,782,948 | Steinberg | Feb. 26, 1957 |

FOREIGN PATENTS

| | | |
|---|---|---|
| 566,125 | Germany | Mar. 11, 1931 |
| 588,470 | Germany | Nov. 28, 1933 |